United States Patent
Qin et al.

(10) Patent No.: US 12,520,256 B2
(45) Date of Patent: Jan. 6, 2026

(54) TIME SYNCHRONIZATION OPERATION IN VEHICLE COMMUNICATION

(71) Applicant: QUALCOMM Incorporated, San Diego, CA (US)

(72) Inventors: Yi Qin, Beijing (CN); Jintao Hou, Beijing (CN); Xiaochen Chen, Beijing (CN); Chunxia Li, Beijing (CN); Zengyu Hao, Beijing (CN); Haizhou Liu, Beijing (CN); Feng Chen, Beijing (CN); Ang Li, Tongzhou (CN); Hongjin Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 17/906,892

(22) PCT Filed: May 8, 2020

(86) PCT No.: PCT/CN2020/089232
§ 371 (c)(1),
(2) Date: Sep. 21, 2022

(87) PCT Pub. No.: WO2021/223229
PCT Pub. Date: Nov. 11, 2021

(65) Prior Publication Data
US 2023/0247573 A1    Aug. 3, 2023

(51) Int. Cl.
*H04W 56/00* (2009.01)
*G04R 20/02* (2013.01)
(52) U.S. Cl.
CPC ........ *H04W 56/0015* (2013.01); *G04R 20/02* (2013.01)

(58) Field of Classification Search
CPC ............. H04W 56/0015; H04W 76/14; H04W 92/18; H04W 4/40; H04W 48/10; H04W 56/0035; G04R 20/02; G01S 19/24
See application file for complete search history.

(56) References Cited

U.S. PATENT DOCUMENTS

| 2018/0020496 A1 | 1/2018 | Vanderveen et al. |
| 2018/0213498 A1* | 7/2018 | Khoryaev ............ H04B 7/2684 |

(Continued)

FOREIGN PATENT DOCUMENTS

| CN | 109358487 A | 2/2019 |
| CN | 110198529 A | 9/2019 |

(Continued)

OTHER PUBLICATIONS

International Search Report and Written Opinion—PCT/CN2020/089232—ISA/EPO—Feb. 8, 2021.

(Continued)

*Primary Examiner* — Charles C Jiang
*Assistant Examiner* — Margaret Marie Anderson
(74) *Attorney, Agent, or Firm* — Weaver Austin Villeneuve & Sampson LLP/QUALCOMM Incorporated

(57) ABSTRACT

Methods and systems for performing time synchronization for a Cellular Vehicle-to-Everything (C-V2X) wireless interface of a vehicle are provided. In one example, a method comprises: determining, by a vehicle UE, whether a Global Navigation Satellite System (GNSS) receiver of the vehicle receives a GNSS signal including time information for a time synchronization operation for the vehicle's local clock source; based on whether the GNSS receiver receives a GNSS signal including the time information, adjusting a local clock time of the vehicle's local clock source based on one of: the time information included in the GNSS signal, or one or more wireless signals broadcasted from a base (Continued)

station; and adjusting, based on the adjusted local clock time, at least one of: a phase or a frequency of a clock signal supplied to the C-V2X wireless interface.

15 Claims, 13 Drawing Sheets

(56) References Cited

U.S. PATENT DOCUMENTS

| | | | |
|---|---|---|---|
| 2019/0037513 A1* | 1/2019 | Yang | H04W 56/002 |
| 2019/0086555 A1 | 3/2019 | Chandrasekar et al. | |
| 2019/0166451 A1 | 5/2019 | Mishra et al. | |
| 2019/0239172 A1 | 8/2019 | Hampel et al. | |
| 2019/0289561 A1* | 9/2019 | Corley | H04W 24/02 |
| 2019/0335532 A1* | 10/2019 | Kim | H04W 76/11 |
| 2019/0380087 A1* | 12/2019 | Park | H04W 72/29 |
| 2020/0053524 A1* | 2/2020 | Novlan | H04W 84/20 |
| 2020/0106542 A1* | 4/2020 | Liu | G06F 1/12 |
| 2022/0038878 A1 | 2/2022 | Jung et al. | |
| 2022/0417883 A1* | 12/2022 | Fu | H04J 3/12 |

FOREIGN PATENT DOCUMENTS

| | | | |
|---|---|---|---|
| CN | 110967967 A | 4/2020 | |
| JP | 2017092652 A | 5/2017 | |
| KR | 20170088490 A * | 8/2017 | ............ H04W 56/00 |
| WO | 2017171284 A1 | 10/2017 | |
| WO | 2018173795 A1 | 9/2018 | |
| WO | 2020060289 A1 | 3/2020 | |

OTHER PUBLICATIONS

LG Electronics: "Potential Enhancements for PC5-Based V2V", 3GPP TSG RAN WG1 Meeting #82, R1-154290, Aug. 28, 2015 (Aug. 28, 2015), section 2, 4 Pages.
Supplementary European Search Report—EP20934421—Search Authority—The Hague—Feb. 7, 2024.
3GPP TS 36.331: "3rd Generation Partnership Project, Technical Specification Group Radio Access Network, Evolved Universal Terrestrial Radio Access (E-UTRA), Radio Resource Control (RRC), Protocol specification (Release 16)", 3GPP TS 36.331 V16.0.0, Mar. 2020, Technical Specification, pp. 1-1048, Apr. 6, 2020, Chapter 5.2.1.1, 5.2.3, 5.5.6.2, 5.10.2.2, 5.10.8, 5.10.8.2, 5.10.9.1, 5.10.14, 6.2.2, 6.3.1, 6.3.5, A. 3.1.1.
Taiwan Search Report—TW110106353—TIPO—Jan. 11, 2025.

* cited by examiner

```
-- ASN1START

MasterInformationBlock ::=      SEQUENCE {
    dl-Bandwidth                ENUMERATED {
                                    n6, n15, n25, n50, n75, n100},
    phich-Config                PHICH-Config,
    systemFrameNumber           BIT STRING (SIZE (8)),        -- 330
    schedulingInfoSIB1-BR-r13   INTEGER (0..31),
    systemInfoUnchanged-BR-r15  BOOLEAN,
    spare                       BIT STRING (SIZE (4))
}

-- ASN1STOP
```

FIG. 3B

```
SystemInformationBlockType16-r11 ::=    SEQUENCE {
    timeInfo-r11                        SEQUENCE {
        timeInfoUTC-r11                 INTEGER (0..549755813887),   ──340
        daylightSavingTime-r11          BIT STRING (SIZE (2))       OPTIONAL,  -- Need OR
        leapSeconds-r11                 INTEGER (-127..128)         OPTIONAL,  -- Need OR
        localTimeOffset-r11             INTEGER (-63..64)           OPTIONAL,  -- Need OR
    }
    lateNonCriticalExtension            OCTET STRING                OPTIONAL,  -- Need OP
    ...
}
```

FIG. 3D

```
-- ASN1START

SystemInformationBlockType8 ::=    SEQUENCE {
    systemTimeInfo              SystemTimeInfoCDMA2000                    OPTIONAL,   -- Need OR
    searchWindowSize            INTEGER (0..15)                           OPTIONAL,   -- Need OR
    parametersHRPD              SEQUENCE {
        preRegistrationInfoHRPD       PreRegistrationInfoHRPD,
        cellReselectionParametersHRPD CellReselectionParametersCDMA2000   OPTIONAL    -- Need OR
    }                                                                     OPTIONAL,   -- Need OR
    parameters1XRTT             SEQUENCE {
        csfb-RegistrationParam1XRTT   CSFB-RegistrationParam1XRTT         OPTIONAL,   -- Need OR
        longCodeState1XRTT            BIT STRING (SIZE (42))              OPTIONAL,   -- Need OR
        cellReselectionParameters1XRTT CellReselectionParametersCDMA2000  OPTIONAL    -- Need OR
    }                                                                     OPTIONAL,   -- Need OR
    ...,
    lateNonCriticalExtension    OCTET STRING                              OPTIONAL,   -- Need OP
    [[ csfb-SupportForDualRxUEs-r9 BOOLEAN                                OPTIONAL,   -- Need OR
       cellReselectionParametersHRPD-v920 CellReselectionParametersCDMA2000-v920 OPTIONAL, --
       cellReselectionParameters1XRTT-v920 CellReselectionParametersCDMA2000-v920 OPTIONAL, --
Cond WCL-HRPD
    cellReselectionParameters1XRTT-v920 CellReselectionParametersCDMA2000-v920 OPTIONAL, --
Cond WCL-1XRTT
    csfb-RegistrationParam1XRTT-v920  CSFB-RegistrationParam1XRTT-v920    OPTIONAL, --
Cond REG-1XRTT
```

— 350 (highlighting systemTimeInfo SystemTimeInfoCDMA2000)

FIG. 3E

TIME SYNCHRONIZATION OPERATION IN VEHICLE COMMUNICATION

RELATED APPLICATIONS

This application claims the benefit of International Application No. PCT/CN2020/089232, filed May 8, 2020, entitled "TIME SYNCHRONIZATION OPERATION IN VEHICLE COMMUNICATION", which is assigned to the assignee hereof, and incorporated herein in its entirety by reference.

BACKGROUND

Clock synchronization is essential for a distributed network system. It provides a common time frame among the network nodes of the distributed network system to support various network functions, such as message transmission, channel scheduling and resource sharing in real-time and correct order. Clock synchronization also enables secure connectivity, data consistency and process coordination among the network nodes of the distributed network system.

Accurate time is especially important in network applications with high mobility such as in a vehicular network, which may need to support vehicle-to-vehicle and vehicle-to-infrastructure communication. In such a vehicular network, at least some of the network nodes (e.g., the vehicles) can be moving rapidly, and may establish communications by forming networks in an ad-hoc manner. Such ad-hoc networks are typically very short-lived and may depend on the speed of the vehicles. In such a network, providing a reliable and constant access to an accurate network-wide time to the network nodes becomes even more critical.

Currently, vehicle networks, such as Cellular Vehicle-to-Everything (C-V2X) networks, uses Global Navigation Satellite System (GNSS) to perform a time synchronization operation. GNSS satellites typically include atomic clocks that are monitored and controlled to be highly synchronized and traceable to national and international standards, such as coordinated universal time (UTC). GNSS satellites can transmit the time information in GNSS signals. Each vehicle in a vehicle network can include a GNSS receiver to receive GNSS signals from one or more GNSS satellite, and synchronize its clock based on the time information included in the GNSS signals. As a result of each vehicle synchronizing its own clock to the same clock of GNSS satellites, time synchronization (to the precision of atomic clocks) can be achieved in the vehicle network.

Although GNSS provides an accessible mechanism to provide time synchronization to a vehicle network, a vehicle may be unable to receive the time information included in the GNSS signals. This can be due to, for example, the vehicle entering a location where there is no or very weak GNSS signal coverage. For example, the vehicle may be moving into a location which completely block off GNSS signals (e.g., underground), or moving in a locale where the GNSS signals can be substantially blocked or attenuated by structures (e.g., mountains, tall buildings, etc.). In these scenarios, the vehicle may be unable to perform a time synchronization operation when the vehicle is out of GNSS coverage and cannot operate in the vehicle network.

BRIEF SUMMARY

Techniques described herein address these and other issues by providing for a hybrid mechanism to perform a time synchronization operation for a C-V2X wireless interface of a vehicle. The vehicle may include a GNSS receiver, and a vehicle user equipment (vehicle UE) including the C-V2X wireless interface to support C-V2X communication with other apparatuses such as a base station, an infrastructure such as road side unit (RSU), other vehicles, etc. The vehicle further includes a local clock source to provide timing information for the C-V2X wireless interface. The timing information can include periodic clock signals supplied to the wireless interface, a local clock time maintained at the local clock source, etc. The GNSS receiver and the local clock source can be part of or external to the vehicle UE.

The vehicle UE can implement a hybrid mechanism to synchronize the local clock source, as well as the operation of the C-V2X wireless interface, with an external clock source in a time synchronization operation. Specifically, the vehicle UE can include a synchronization module. At the beginning of the time synchronization operation, the synchronization module can determine whether the GNSS receiver receives a GNSS signal including time information for the time synchronization operation. If the synchronization module determines that the GNSS receiver receives a GNSS signal including the time information, the synchronization module can provide the time information included in the GNSS signals to the local clock source to perform the time synchronization operation. On the other hand, if the GNSS receiver does not receive the GNSS signal including the time information, the synchronization module can determine that time synchronization operation is to be performed based on wireless signals from a base station of a cellular network (e.g., LTE, 5G NR, etc.). The time synchronization operation may further include, for example, adjusting a local clock time maintained by the local clock source, adjusting a frequency and/or a phase of the periodic clock signals supplied to the C-V2X wireless interface, etc. In some examples, synchronization module can continue monitoring the GNSS signals received by the GNSS receiver, and can switch back to use a GNSS signal for the time synchronization operation if a GNSS signal including the time information for the time synchronization operation is received.

The synchronization module can determine whether the GNSS receives a GNSS signal including time information for the time synchronization operation in various ways. In one example, the synchronization module can determine whether the GNSS signal received by the GNSS receiver, if any, has a sufficient signal strength or a sufficiently low level of noise to allow extraction of the time information from the GNSS signal. In another example, the synchronization module can determine whether the GNSS signal includes time information at all. The GNSS receiver may not receive a GNSS signal including the time information for the time synchronization operation if, for example, the vehicle is in a location with poor GNSS signal reception (e.g., underground), the GNSS receiver is faulty, the GNSS signal does not include the time information, etc.

If the GNSS receiver does not receive the GNSS signal including the time information, the synchronization module can perform a time synchronization operation based on one or more wireless signals broadcasted by a base station. The wireless signals can be part of messages broadcasted by the base station to assist the vehicle UE in selecting and registering with the cell managed by the base station. The wireless signal may include, for example, System Information Block (SIB) messages and Master Information Block (MIB) message. In one example, the vehicle UE may receive a SIB type 21 (SIB 21) message. SIB 21 is a message that can be used to convey configuration information, such as RRC Messages, to support C-V2X Sidelink Communication. SIB 21 is defined in, for example, 3$^{rd}$ Generation Partnership Project, Technical Specification Group Radio Access Network, Evolved Universal Terrestrial Radio Access (E-UTRA) and Radio Resource Control (RRC) Protocol specification (3GPP TS 36.331 version 15.8.0 Release 15). Based on receiving SIB 21, synchronization module can determine that the base station supports C-V2X communication. Based on such determination, the synchronization module may perform the time synchronization operation with the base station to support the C-V2X communication.

In some examples, the time synchronization operation can be based on information included in a Master Information Block (MIB) message broadcasted by the base station. Master Information Block is defined in, for example, LTE Evolved Universal Terrestrial Radio Access (E-UTRA) and Radio Resource Control (RRC) Protocol specification (3GPP TS 36.331 version 10.1.0 Release 10). MIB message can be broadcasted by the base station periodically using a physical layer channel, such as Physical Broadcast Channel (PBCH) and include information such as, for example, system bandwidth, a system frame number, etc. An SFN can represent a local clock time at the base station. An SFN can be range between 0 to 1023 and can be generated by a counter, which updates a count value representing the SFN at each 10 millisecond (ms) interval. The counter can reset back to zero when it reaches 1023. The synchronization module can also maintain and update a local system frame number based on a local clock. The synchronization module can compare the system frame number in MIB with its local system frame number, and control the local clock source to adjust the local clock time based on a difference between the two system frame numbers.

In another example, the UE may receive a SIB Type 16 (SIB 16) or a SIB Type 8 (SIB 8) message. SIB type 16 and SIB type 8 are both defined in LTE Evolved Universal Terrestrial Radio Access (E-UTRA) and Radio Resource Control (RRC) Protocol specification (3GPP TS 36.331 version 11.5.0 Release 11). An SIB Type 16 message contains information related to GPS time and Coordinated Universal Time (UTC). Moreover, an SIB type 8 message contains information for inter-RAT cell re-selection. The information includes an absolute time in the current cell. The synchronization module can obtain time information (e.g., UTC time, absolute time in the current cell, etc.) from the SIB, and forward the time information to the local clock source to update the local clock time. In some examples, the UE may use SIB Type 16 or SIB Type 8 message to perform the time synchronization operation based on determining that no SIB Type 21 message is received from the base station.

An example method of performing time synchronization for a vehicle's wireless communication interface comprises: determining, by a UE of the vehicle, whether a GNSS receiver of the vehicle receives a GNSS signal including time information for a time synchronization operation of the vehicle's local clock source; and based on whether the GNSS receiver receives the GNSS signal including the time information, performing the time synchronization operation of the vehicle's local clock source based on one of: the time information included in the GNSS signal, or a wireless signal from a base station. The wireless signal can include, for example, a SIB type 8 message, a SIB type 16 message, a SIB type 21 message, a MIB message, etc.

Example devices, means, and non-transistory computer readable medium storing instructions for performing the aforementioned methods are also described.

BRIEF DESCRIPTION OF THE DRAWINGS

FIG. 3A, FIG. 3B, FIG. 3C, FIG. 3D, FIG. 3E, and FIG. 3F illustrate examples of a hybrid time synchronization operation performed by a vehicle communication system.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110-A, 110-B, 110-C, etc. When referring to such an element using only the first number, any instance of the element is to be understood (e.g., element 110 in the previous example would refer to elements 110-1, 110-2, and 110-3 or to elements 110-A, 110-B, and 110-C).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
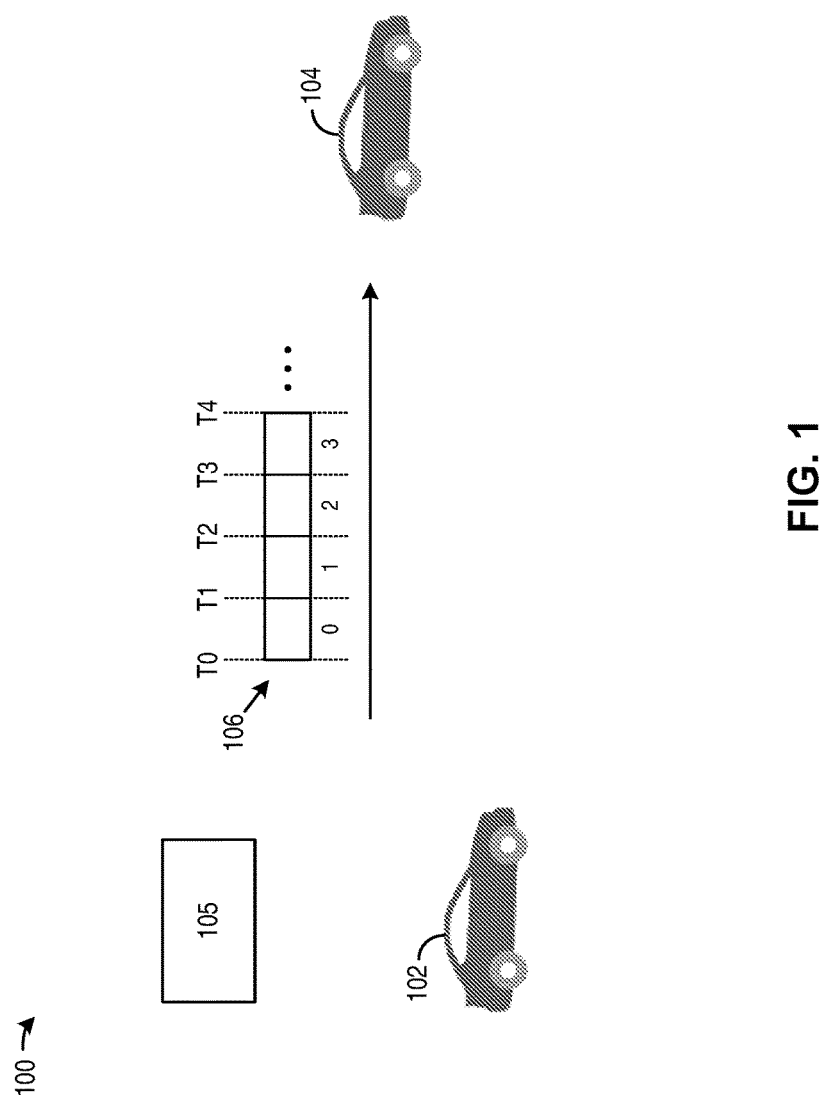
FIG. 1 illustrates an example C-V2X network in which the disclosed techniques can be used.

Clock synchronization is essential for a distributed network system, especially for network applications with high mobility such as in a vehicular network. An example of a vehicle network is Cellular-Vehicle-to-Everything (C-V2X). FIG. 1 illustrates an example of a vehicle network 100 formed based on wireless communication among vehicles 102 and 104 as well as an infrastructure 105 (e.g., base station, road side unit, etc.). To enable the wireless communication, the operations of the wireless interface of vehicles 102 and 104, as well as infrastructure 105, need to be synchronized to a common time. For example, as shown in FIG. 1, vehicle 102, or infrastructure 105, may send a plurality of subframes 106 of wireless data at pre-determined clock times to vehicle 104. Vehicle 102 may send, between clock times T0 and T1, subframe 0 of wireless data, followed by subframe 1 between clock times T1 and T2, subframe 2 between clock times T2 and T3, subframe 3 between clock times T3 and T4, etc. Each subframe may include a different set of symbols and/or modulated using a different set of carrier frequencies.

In order for vehicle 104 to properly process each subframe (e.g., to use the correct set of carrier frequencies to demodulate the sub-frame wireless signals) from vehicle 102/infrastructure 105, vehicle 104 may need also need to track the reception clock times of each subframe. For example, vehicle 104 may determine that a wireless signal received between clock times T0 and T1 is sub-frame 0, a wireless signal received between clock times T1 and T2 is sub-frame 1, a wireless signal received between clock times T2 and T3 is sub-frame 2, whereas a wireless signal received between clock times T3 and T4 is sub-frame 3.

The proper processing of the subframes by vehicle 104 may require the local clock times at vehicles 102 and 104 and infrastructure 105 to be identical. For example, if the local clock times T1 and T2 at vehicle 104 aligns, in time, with the local clock times T0 and T1 at vehicle 102, vehicle 104 may incorrectly determine the wireless signal received between clock times T1 and T2 at vehicle 104 to be subframe 1, when in fact it is subframe 0 which is transmitted between clock times T0 and T1 at vehicle 102. In addition, typically a local clock time is maintained at a local clock source, which can derive clock signals from the local clock time and supply the clock signals to different components of the wireless interface. Maintaining the same clock time at the local clock sources of vehicles 102 and 104 and infrastructure 105 can ensure that the clock signals supplied to the wireless interfaces of vehicles 102 and 104 and infrastructure 105 are synchronized and have a deterministic phase relationship. This can improve the consistency and reliability of the network connections among vehicles 102 and 104 and infrastructure 105.

One way to maintain the same clock time at the local clocks of different vehicles is by performing a periodic time synchronization operation with an external clock source, such as Global Navigation Satellite System (GNSS). GNSS satellites typically include atomic clocks that are monitored and controlled to be highly synchronized and traceable to national and international standards, such as coordinated universal time (UTC).

Figure 2A:
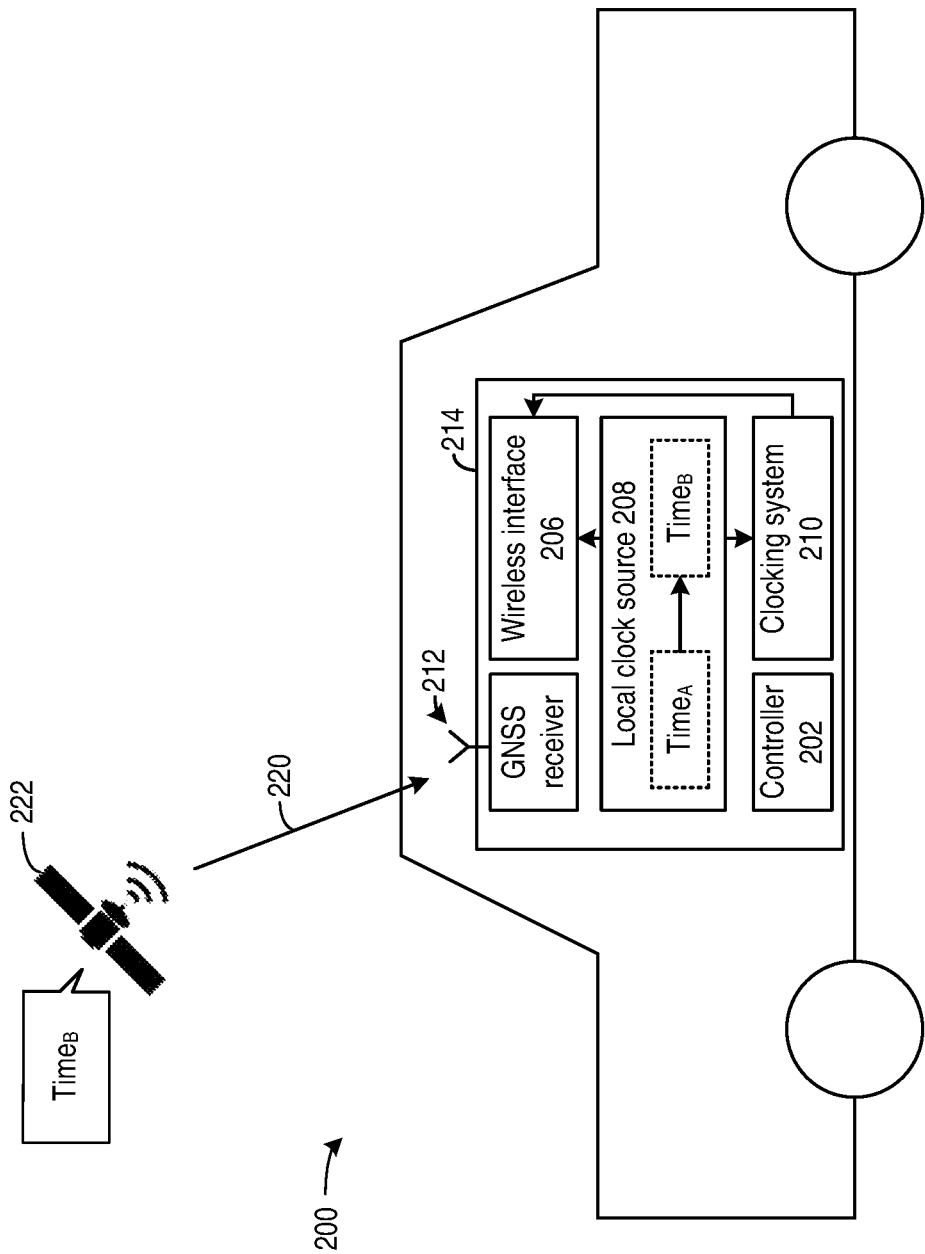
FIG. 2A and FIG. 2B illustrate an example vehicle communication system.

FIG. 2A illustrates an example of time synchronization based on GNSS signals. As shown in FIG. 2A, a vehicle 200 may include a controller 202, a vehicle network wireless interface 206, a local clock source 208, a clocking system 210, as well as a GNSS receiver 212, all of which can be part of a vehicle communication system 214, which can be a user equipment (UE). Controller 202 can coordinate and manage various operations of wireless interface 206 and local clock source 208. For example, controller 202 can manage transmission and processing of wireless signals at wireless interface 206, as well as the time synchronization operation of local clock source 208. Wireless interface 206 can provide C-V2X communication with other vehicles and infrastructure. Local clock source 208 can include an oscillator that can generate a periodic clock signal, as well as digital logic circuits (e.g., counters) that can update and store a local clock time based on the clock signal. The local clock time (labelled $Time_A$ and $Time_B$ in FIG. 2A) can be sent to wireless interface 206 to, for example, enable wireless interface 206 to determine the reception times of subframes and to identify each subframe based on the reception times, as described above. The local clock time can also be adjusted by controller 202 in the time synchronization operation. Clocking system 210 can derive clock signals from the local clock time (or the clock signal from the oscillator) and supply the clock signals to wireless interface 206 as well as other components of vehicle 200. For example, clocking system 210 can receive a count value from local clock source 208 representing the local clock time and generate periodic clock signals of different frequencies based on dividing the count value.

In addition, GNSS receiver 212 can receive a GNSS signal 220 from a satellite 222. Satellite 222 can be part of a Satellite Positioning System (SPS) such as, for example, Global Positioning System (GPS) signals, Global Navigation Satellite System (GLONASS) signals, Galileo signals, BeiDou signals, and/or signals of other type of satellite positioning system. Satellite 222 may include an atomic clock, which can maintain a local clock time $Time_B$ which can be a coordinated universal time (UTC). Satellite 222 can transmit GNSS signal 220 including the local clock time $Time_A$. GNSS receiver 212 can receive GNSS signal 220 and extract local clock time $Time_A$ from GNSS signal 220. Controller 202 can then update a current local clock time stored in local clock source 208 from $Time_A$ to $Time_B$. Clocking system 210 can also update at least one of the phases or frequencies of the clock signals based on the adjusted local clock time.

After the updating of the current local clock time, local clock source 208 can then continue updating the local clock time based on the periodic clock signal from the oscillator. As the clock signal generated by the oscillator may drift due to random errors, mismatch may reappear between the local clock times stored at local clock source 208 and satellite 222 and increase with time. To reduce the mismatch, the time synchronization operation can be performed periodically to realign the local clock times of local clock source 208 and satellite 222.

The time synchronization operation in FIG. 2A can be performed by multiple vehicles and infrastructures of a vehicle network. Each vehicle and infrastructure of the vehicle network can include a GNSS receiver to receive the same GNSS signal including the same local clock time information from the same satellite (or same set of satellites). Each vehicle and infrastructure of the vehicle network can adjust its local clock time based on the local clock time received from the satellite, so that they can all synchronize their local clock time with the satellite. This can reduce the mismatches in the local clock times, as well as the frequency and phase of the clock signals, among the vehicles and the infrastructure, which can improve the robustness of the vehicle network.

Figure 2B:
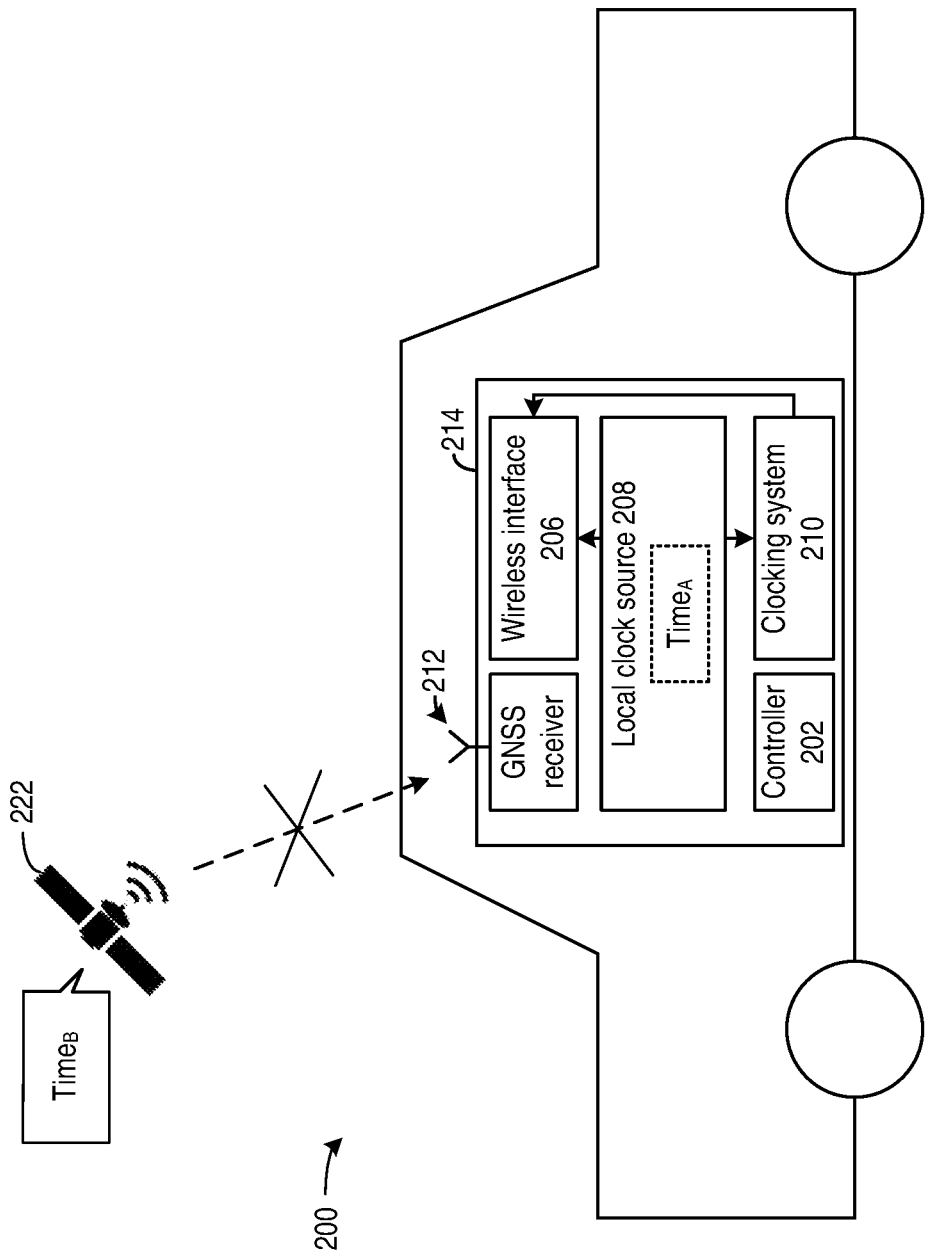

Although GNSS provides an accessible mechanism to provide time synchronization, vehicle 200 may be unable to receive the local clock information included in GNSS signal 220, as shown in FIG. 2B. This can be due to various reasons. For example, vehicle 200 may enter a location where there is no or very weak GNSS signal coverage. For example, vehicle 200 may be moving into a location which completely block off GNSS signals (e.g., underground), or moving in a locale where the GNSS signals can be substantially blocked or attenuated by structures (e.g., mountains, tall buildings, etc.). As another example, GNSS receiver 212 is faulty and cannot extract local clock time information from GNSS signal 220. As yet another example, GNSS signal 220 transmitted by satellite 222 does not include the local clock time information. In all these examples, vehicle 200 may be unable to perform a time synchronization operation and cannot adjust the local clock time of local clock source 208. Due to lack of time synchronization, vehicle 200 may be unable to join the vehicle network and cannot communicate with other vehicles and/or infrastructures in the vehicle network as a result.

Figure 3A:
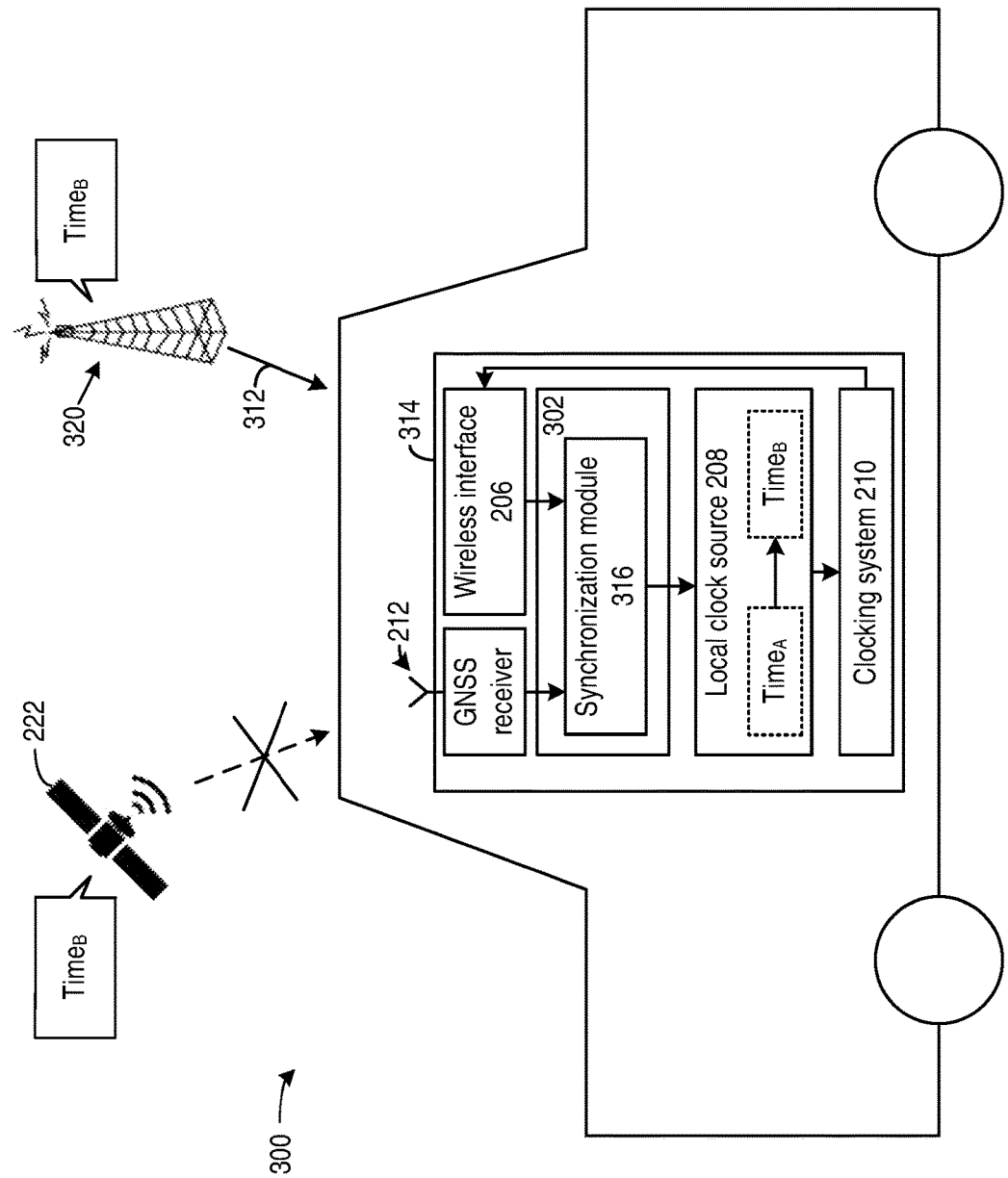

FIG. 3A illustrates an example of a vehicular communication system that can address some of the issues above. As shown in FIG. 3A, a vehicle 300 can include a controller 302, vehicle network wireless interface 206, local clock source 208, clocking system 210, as well as a GNSS receiver 212, all of which can be part of a vehicle communication system 314, which can be a vehicle user equipment (vehicle UE). As in FIG. 2A and FIG. 2B, controller 302 can coordinate and manage various operations of wireless interface 206 and local clock source 208. Wireless interface 206 can provide C-V2X communication with other vehicles and a base station/eNodeB 320 of a cellular network (e.g., LTE, 5G NR, etc.). Local clock source 208 can include an oscillator that can generate a periodic clock signal, as well as digital logic circuits (e.g., counters) that can update and store a local clock time based on the clock signal. Clocking system 210 can derive clock signals from the local clock time (or the clock signal from the oscillator) and supply the clock signals to wireless interface 206 as well as other components of vehicle 300, as described above in FIG. 2A and FIG. 2B.

In addition, controller 302 can include a synchronization module 316. Synchronization module 316 can implement a hybrid mechanism to synchronize local clock source 208 with an external clock source, in a time synchronization operation. The external clock source can be one of satellite 222 or eNodeB 320. Specifically, at the beginning of the time synchronization operation, synchronization module 316 can determine whether GNSS receiver 212 receives a GNSS signal 220 including time information for the time synchronization operation. If synchronization module 316 determines that GNSS receiver 212 receives a GNSS signal including the time information (e.g., GNSS signal 220 of FIG. 2A), synchronization module 316 can provide the time information included in the GNSS signal to local clock source 208 to perform the time synchronization (e.g., adjusting local time $Time_A$ to become $Time_B$), as in FIG. 2A. On the other hand, if GNSS receiver 212 does not receive a GNSS signal including the time information, synchronization module 316 can determine that time synchronization operation is to be performed based on a wireless signal 312 received from base station 320.

Synchronization module 316 can determine whether GNSS receiver 212 receives a GNSS signal including time information for the time synchronization operation in various ways. In one example, synchronization module 316 can determine whether the GNSS signal received by GNSS receiver 212, if any, has a sufficient signal strength or a sufficiently low level of noise to allow extraction of the time information from the GNSS signal. In another example, synchronization module 316 can determine whether the GNSS signal includes time information at all. GNSS receiver 212 may not receive a GNSS signal including the time information for the time synchronization operation if, for example, vehicle 300 is in a location with poor GNSS signal reception (e.g., underground), GNSS receiver 212 is faulty, the GNSS signal does not include the time information, etc.

If synchronization module 316 determines that GNSS receiver 212 does not receive the GNSS signal including the time information, synchronization module 316 can perform the time synchronization operation based on wireless signal 312 broadcasted by base station 320. The wireless signal can be part of messages broadcasted by the base station to assist the vehicle UE in selecting and registering with the cell managed by the base station, as part of the camp on operation. The wireless signal may include, for example, System Information Block (SIB) messages.

In one example, vehicle 300 may receive a System Information Block type 21 (SIB 21) message from base station 320. SIB 21 is a message that can be used to convey configuration information, such as RRC Messages, to support C-V2X Sidelink Communication. SIB 21 is defined in, for example, 3$^{rd}$ Generation Partnership Project, Technical Specification Group Radio Access Network, Evolved Universal Terrestrial Radio Access (E-UTRA) and Radio Resource Control (RRC) Protocol specification (3GPP TS 36.331 version 15.8.0 Release 15). Based on receiving SIB 21, synchronization module 316 can determine that base station 320 supports C-V2X Communication. Based on such determination, synchronization module 316 may perform the time synchronization operation with base station 320 to support the C-V2X Communication via wireless interface 206.

In some examples, the time synchronization operation can be based on information included in a Master Information Block (MIB) message broadcasted by base station 320. Master Information Block is defined in, for example, LTE Evolved Universal Terrestrial Radio Access (E-UTRA) and Radio Resource Control (RRC) Protocol specification (3GPP TS 36.331 version 10.1.0 Release 10). MIB message can be broadcasted by base station 320 periodically using a physical layer channel, such as Physical Broadcast Channel (PBCH). FIG. 3B illustrates an example of a MIB message. As shown in FIG. 3B, a MIB message can include information such as, for example, system bandwidth, a system frame number (SFN) 330, etc. An SFN can represent a local clock time at the base station. An SFN can be range between 0 to 1023 and can be generated by a counter, which updates a count value representing the SFN at each 10 millisecond (ms) interval. The counter can reset back to zero when it reaches 1023.

Figure 3C:
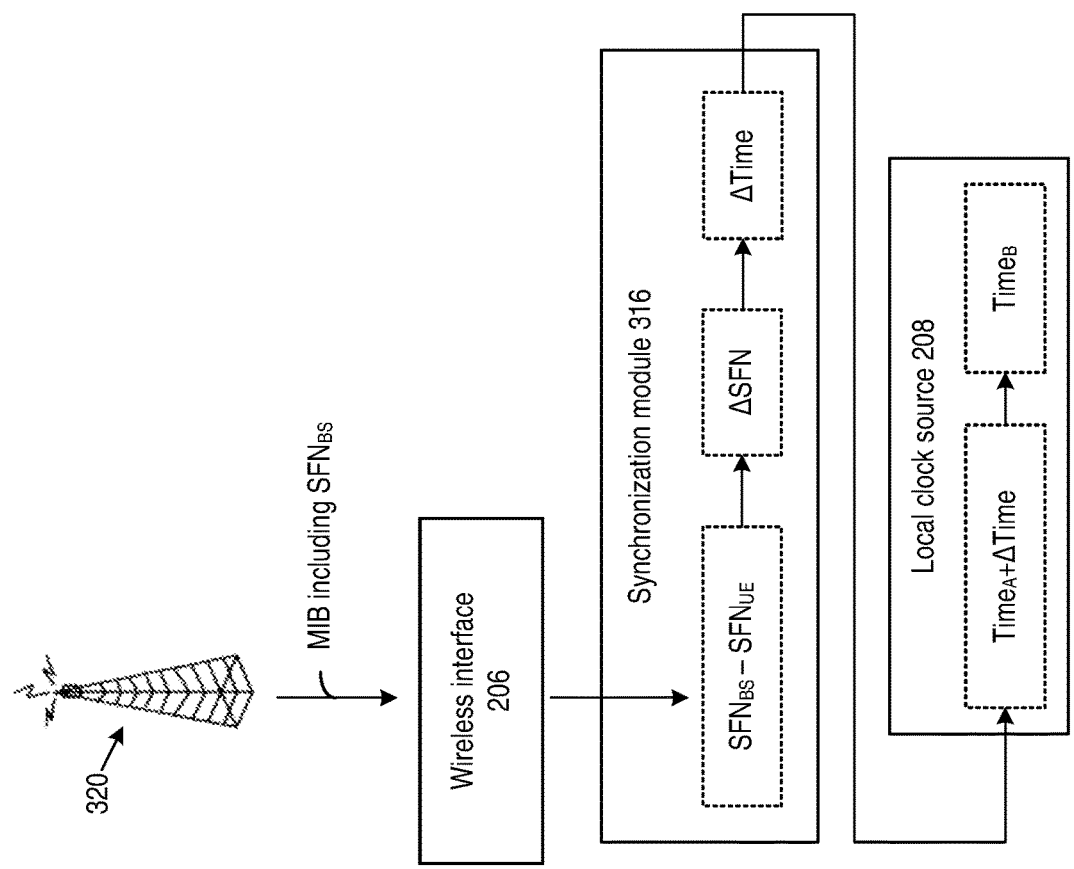

Referring to FIG. 3C, synchronization module 316 can also maintain and update a local system frame number (labelled $SFN_{UE}$) based on the local clock time. For example, the local system frame number can be based on counting the periodic clock signal generated by the oscillator of local clock source 208. Synchronization module 316 can compare the system frame number in MIB (labelled $SFN_{BS}$) with the local system frame number to determine a SFN difference (labelled $\Delta SFN$), as follows:

$$\Delta SFN = SFN_{BS} - SFN_{UE} \quad \text{(Equation 1)}$$

The SFN difference $\Delta SFN$ can be either a positive number or a negative number. In a case where $\Delta SFN$ is a positive number, the local clock time at vehicle 300 leads the local clock time at base station 320, which will require adding a time offset to the local clock time at vehicle 300 to equalize the two local clock times. In a case where $\Delta SFN$ is a negative number, the local clock time at vehicle 300 lags behind the local clock time at base station 320, which will require subtracting a time offset from the local clock time at vehicle 300 to equalize the two local clock times.

Synchronization module 316 can translate the SFN difference to the time offset (labelled $\Delta Time$). The time offset can be determined based on a time interval represented between consecutive SFNs. For example, as described above, the SFN is updated at each 10 ms, the time offset can be determined as follows:

$$\Delta Time = \Delta SFN \times 10 \; ms \quad \text{(Equation 2)}$$

Synchronization module 316 can then provide the time offset $\Delta Time$ to local clock source 208, which can adjust the local clock time based on adding the time offset to the current local clock time. For example, if current local clock time is $Time_A$, local clock source 208 can update the local clock time to $Time_B$ as follows:

$$Time_B = Time_A + \Delta Time \quad \text{(Equation 3)}$$

In a case where the $\Delta SFN$ and $\Delta Time$ are positive, a positive time offset can be added to the local clock time at vehicle 300 to equalize with the local time at base station 320. In a case where the $\Delta SFN$ and $\Delta Time$ are negative, a time offset can be subtracted from the local clock time at vehicle 300 to equalize with the local time at base station 320. Clocking system 210 (not shown in FIG. 3C) can also update at least one of the phases or frequencies of the clock signals (supplied to wireless interface 206 and other components of vehicle 300) based on the adjusted local clock time.

In a case where vehicle 300 does not receive a SIB 21 message, vehicle 300 can perform the time synchronization operations based on other information broadcasted by base station 320. For example, vehicle 300 may receive a SIB type 16 (SIB 16) or a SIB type 8 (SIB 8) message. SIB type 16 and SIB type 8 are both defined in LTE Evolved Universal Terrestrial Radio Access (E-UTRA) and Radio Resource Control (RRC) Protocol specification (3GPP TS 36.331 version 11.5.0 Release 11). FIG. 3D illustrates an example of content of SIB 16, whereas FIG. 3E illustrates an example of content of SIB 8. As shown in FIG. 3D, SIB type 16 message contains a timeInfoUCT field 330. The timeInfoUCT field 330 can indicate a Coordinated Universal Time (UTC time) corresponding to the SFN boundary at or immediately after the ending boundary of a System Information (SI) window in which SystemInformationBlock-Type16 is transmitted. Moreover, as shown in FIG. 3E, an SIB type 8 message contains information for inter-RAT cell re-selection. The information includes a systemTimeInfo field 340, which can indicate an absolute time in the current cell.

Figure 3F:
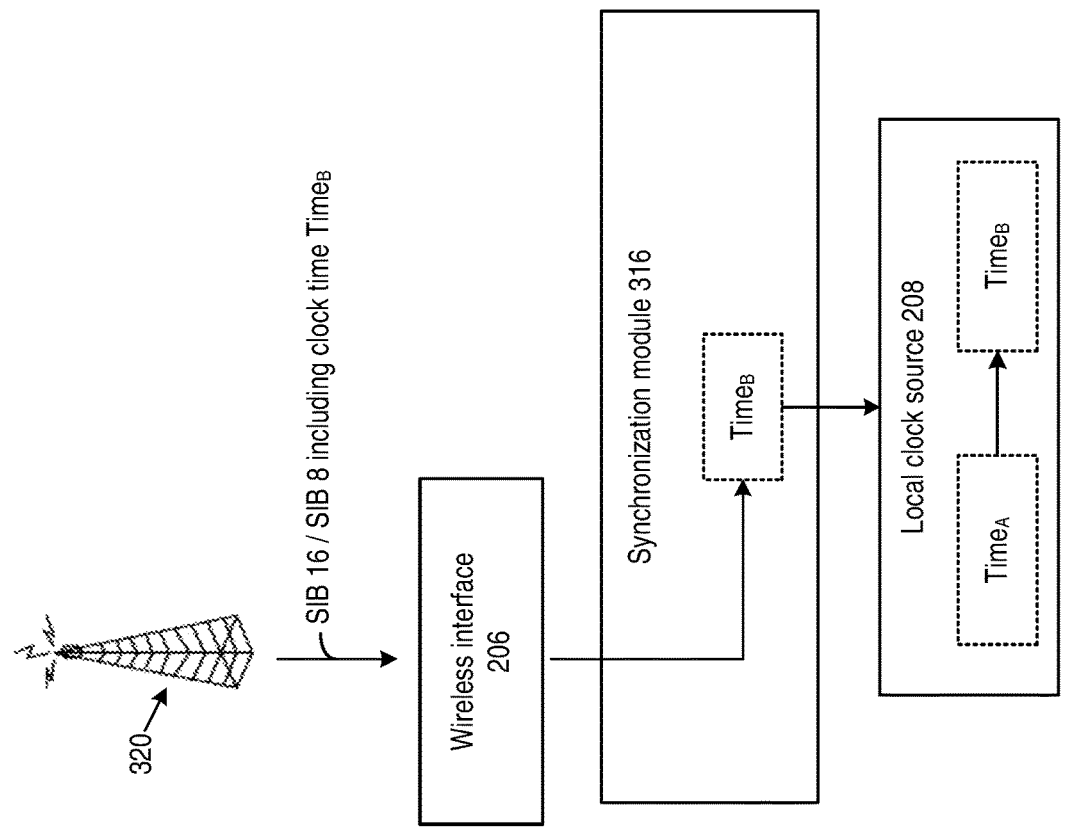

Referring to FIG. 3F, synchronization module 316 can receive an SIB 8 message or an SIB 16 message including a clock time $Time_B$, which can be an UTC time (from SIB 16), an absolute time in a cell (from SIB 8), etc. Synchronization module 316 can then provide the received clock time $Time_B$ to local clock source 208, which can update its current local clock time $Time_A$ with the received clock time $Time_B$. Clocking system 210 (not shown in FIG. 3F) can also update at least one of the phases or frequencies of the clock signals (supplied to wireless interface 206 and other components of vehicle 300) based on the adjusted local clock time.

In the examples of FIG. 3A-FIG. 3F, synchronization module 316 can continue monitoring the GNSS signals received by GNSS receiver 212. Synchronization module 316 can switch back to use a GNSS signal for the time synchronization operation if GNSS receiver 212 receives a GNSS signal including the time information for the time synchronization operation due to, for example, vehicle 300 having moved to a location with improved GNSS signal reception, GNSS receiver 212 receiving a GNSS signal from a different satellite, etc.

Figure 4:
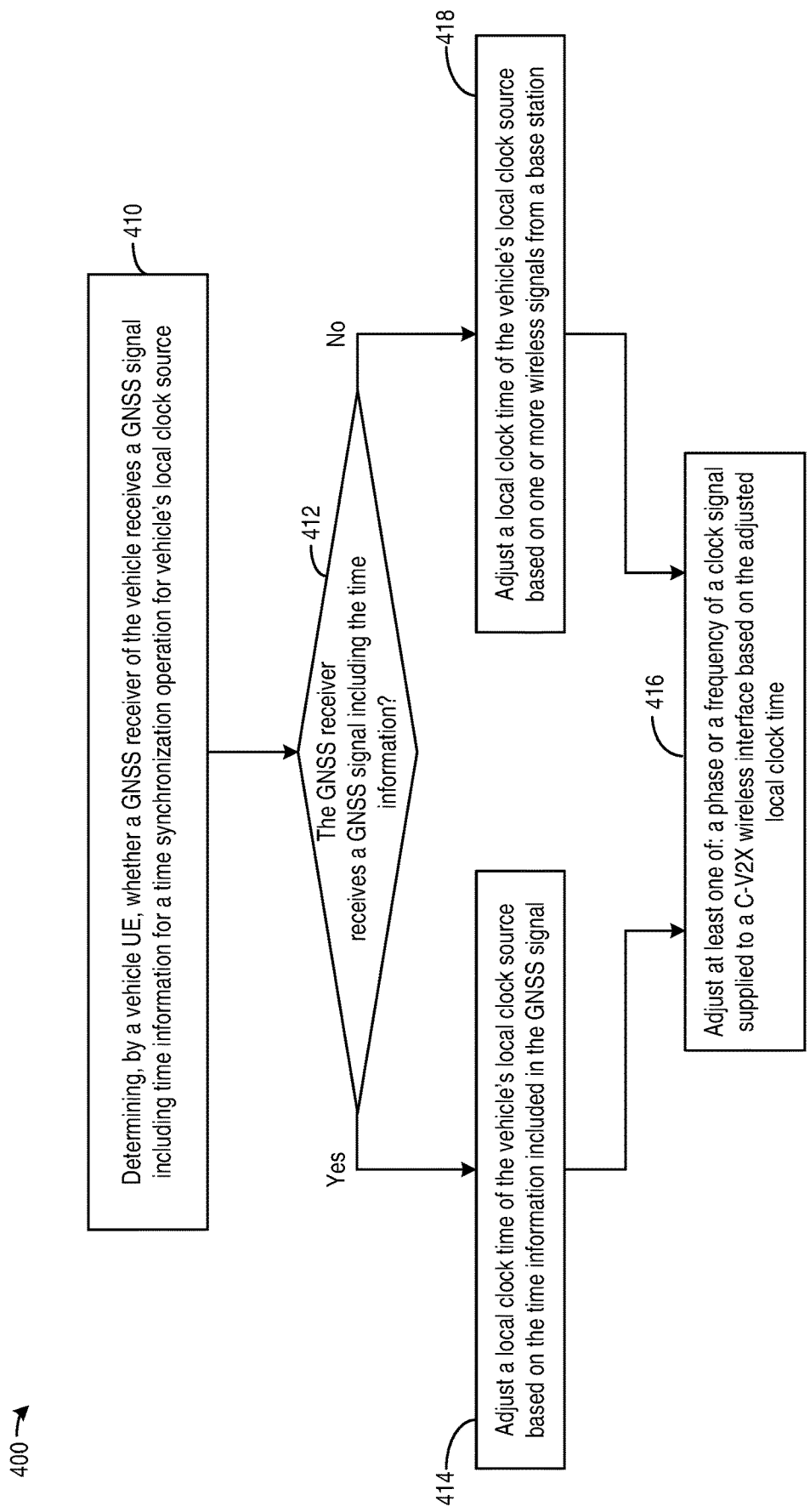
FIG. 4 illustrate an example method of performing a hybrid time synchronization operation for a C-V2X wireless interface.

FIG. 4 illustrates a flowchart of an example method 400 of performing time synchronization for a C-V2X wireless interface of the vehicle. The C-V2X wireless interface (e.g., wireless interface 206) can be part of a vehicle UE that also includes a local clock source, such as local clock source 208, that provides timing information for the C-V2X wireless interface.

Method 400 starts with step 410, in which the vehicle UE (e.g., synchronization module 316) determines whether a GNSS receiver of the vehicle receives a GNSS signal including time information for a time synchronization operation for the vehicle's local clock source. The synchronization module can determine whether the GNSS receiver receives a GNSS signal including the time information for the time synchronization operation in various ways. In one example, the synchronization module can determine whether the GNSS signal received by the GNSS receiver, if any, has a sufficient signal strength or a sufficiently low level of noise to allow extraction of the time information from the GNSS signal. In another example, the synchronization module can determine whether the GNSS signal includes time information at all. The GNSS receiver may not receive a GNSS signal including the time information for the time synchronization operation if, for example, the vehicle is in a location with poor GNSS signal reception (e.g., underground), the GNSS receiver is faulty, the GNSS signal does not include the time information, etc.

If synchronization module 316 determines that the GNSS receiver receives a GNSS signal including the time information (in step 412), synchronization module 316 can perform the time synchronization operation of the vehicle's local clock source based on the time information included in the GNSS signal, in step 414. The synchronization module can provide the time information included in the GNSS signal to local clock source 208, which can adjust a local clock time based on the time information included in the GNSS signal as part of the time synchronization operation. Clocking system 210 can then update at least one of the phases or frequencies of a clock signal supplied to the C-V2X wireless interface based on the adjusted local clock time, in step 416.

If the GNSS receiver does not receive the GNSS signal including the time information (step 412), the synchronization module can perform the time synchronization operation based on one or more wireless signals broadcasted by a base station, in step 418. The one or more wireless signals can be part of messages broadcasted by the base station to assist the vehicle UE in selecting and registering with the cell managed by the base station. The wireless signal may include, for example, System Information Block (SIB) messages and Master Information Block (MIB) message. In one example, the vehicle UE may receive a SIB type 21 (SIB 21) message, which indicates that the base station supports C-V2X communication. The vehicle UE may also receive a Master Information Block (MIB) message from the base station, which includes a system frame number (SFN). Based on receiving the SIB 21 message, the vehicle UE may perform the time synchronization operation based on the SFN of the MIB message. The synchronization module can also maintain and update a local system frame number based on a local clock. The synchronization module can compare the system frame number in the MIB with its local system frame number, and control the local clock source to adjust the local clock time based on a difference between the two system frame numbers, as describe above in Equations 1-3.

In another example, the UE may receive a SIB Type 16 (SIB 16) or a SIB Type 8 (SIB 8) message. An SIB type 16 message contains information related to GPS time and Coordinated Universal Time (UTC). Moreover, an SIB Type 8 message contains information for inter-RAT cell re-selection. The information includes an absolute time in the current cell. The synchronization module can obtain time information (e.g., UTC time, absolute time in the current cell, etc.) from the SIB, and forward the time information to local clock source 208 to update the local clock time. In some examples, the UE may use SIB 16 and/or SIB 8 to perform the time synchronization operation based on not receiving the SIB 21 message from the base station.

Following step 418, clocking system 210 can also update at least one of the phases or frequencies of a clock signal supplied to the C-V2X wireless interface based on the adjusted local clock time, in step 416.

Figure 5A:
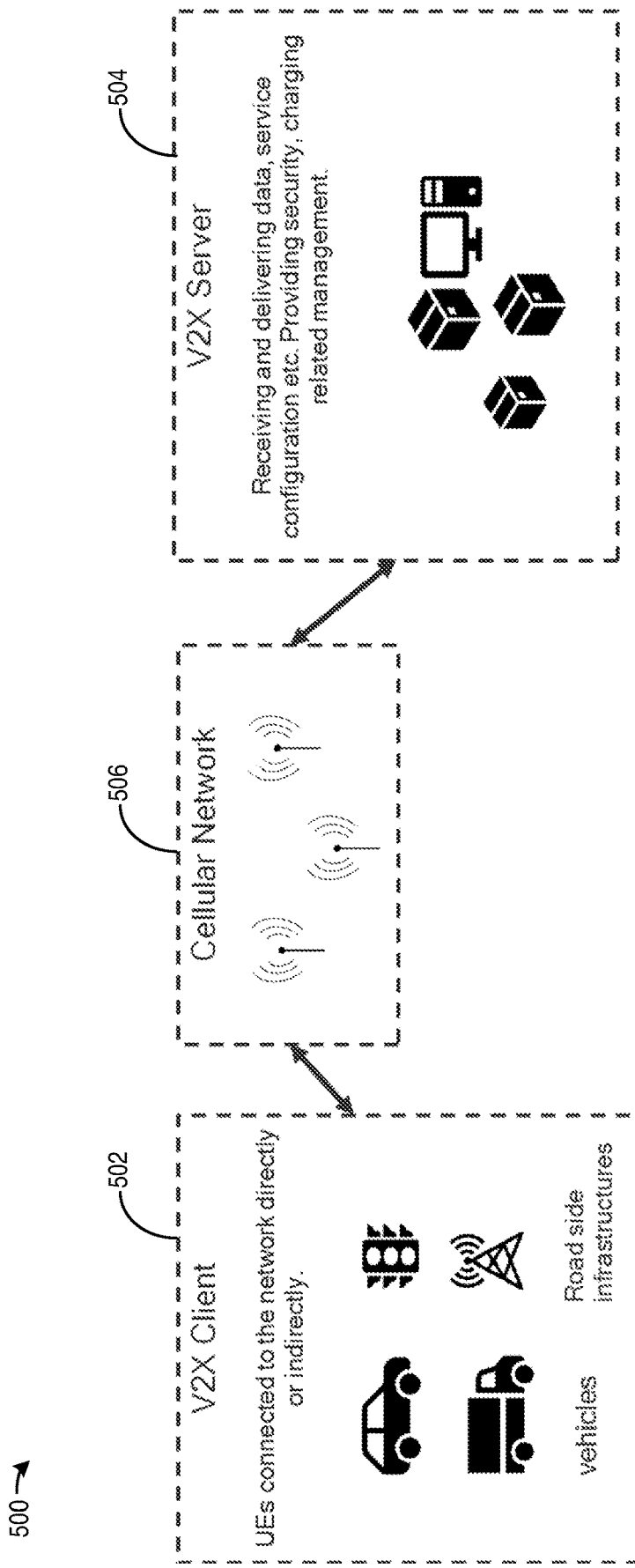
FIG. 5A and FIG. 5B illustrate examples of system architectures for implementing examples of hybrid time synchronization mechanism of FIG. 3A-FIG. 4.
Figure 5B:
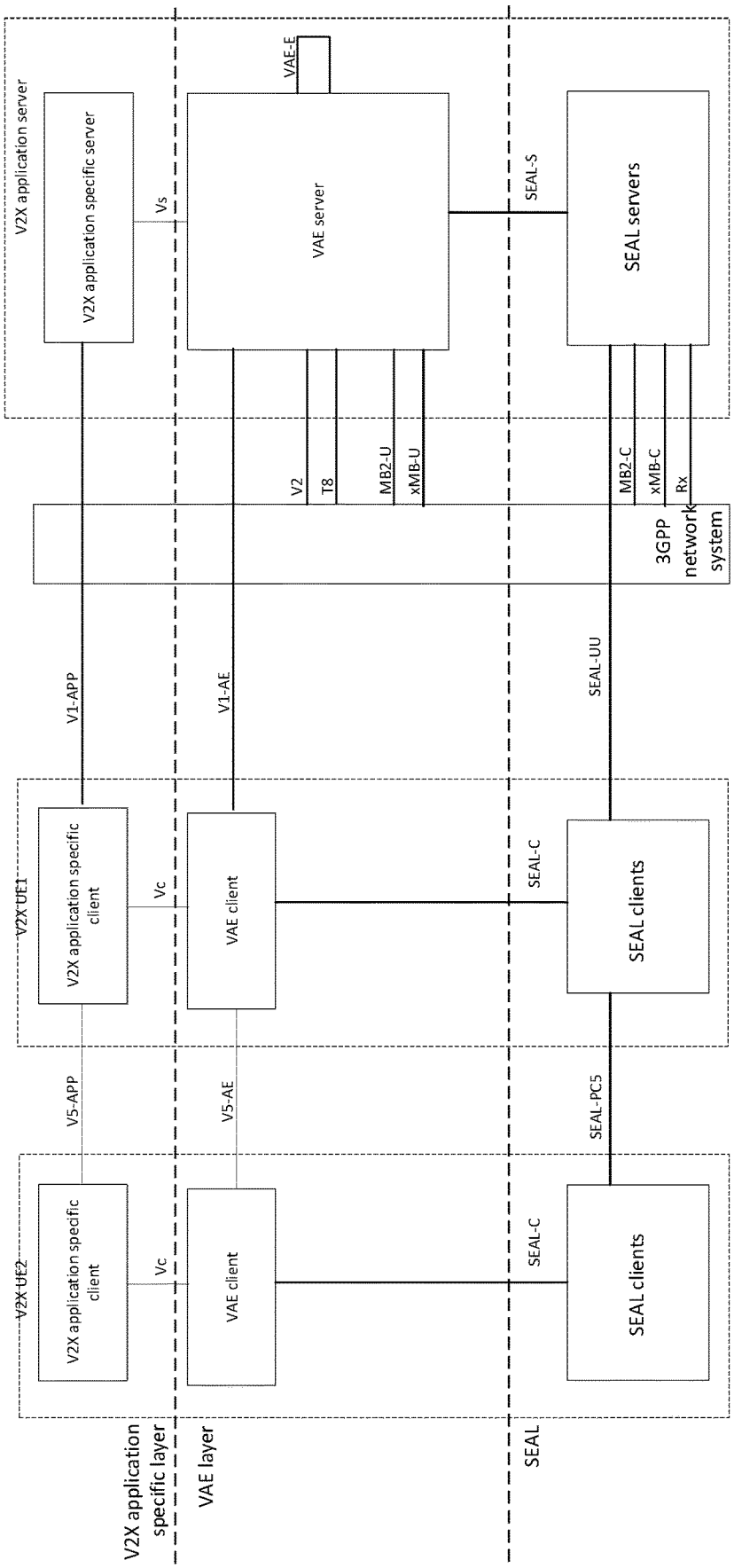

In some examples, the hybrid time synchronization mechanism described above in FIG. 3A to FIG. 4 can be implemented in a V2X application layer. FIG. 5A illustrates an example of an V2X application client-server architecture 500. As shown in FIG. 7A, V2X application client-server architecture 500 comprises a V2X client 502 and a V2X server 504 which can communicate via a cellular network 506. V2X client 502 can be a UE and can be part of a vehicle. For example, synchronization module 316 can be implemented as V2X client 502. On the other hand, V2X server 504 can perform various functions to support the operations of synchronization module 316, such as receiving and delivering data, service configuration, providing data security, etc.

In some examples, the hybrid time synchronization mechanism can be implemented via functional architecture with VAL (Vertical Application Layer) and SEAL (Service Enablement Application Layer) as defined in 3rd Generation Partnership Project (3GPP) Working Group SA6, and in Technical Specification (TS) 23.434 and TS 23.286. FIG. 7B illustrates an example functional architecture diagram 510 of a V2X application layer functional model. As shown in FIG. 7B, the V2X application layer functional entities for the V2X UE and the V2X application server are grouped into the V2X application specific layer and the VAE (V2X application enable) layer. The VAE layer offers the VAE capabilities to the V2X application specific layer. The VAE layer can be considered as an instance of VAL for V2X service.

Figure 6:
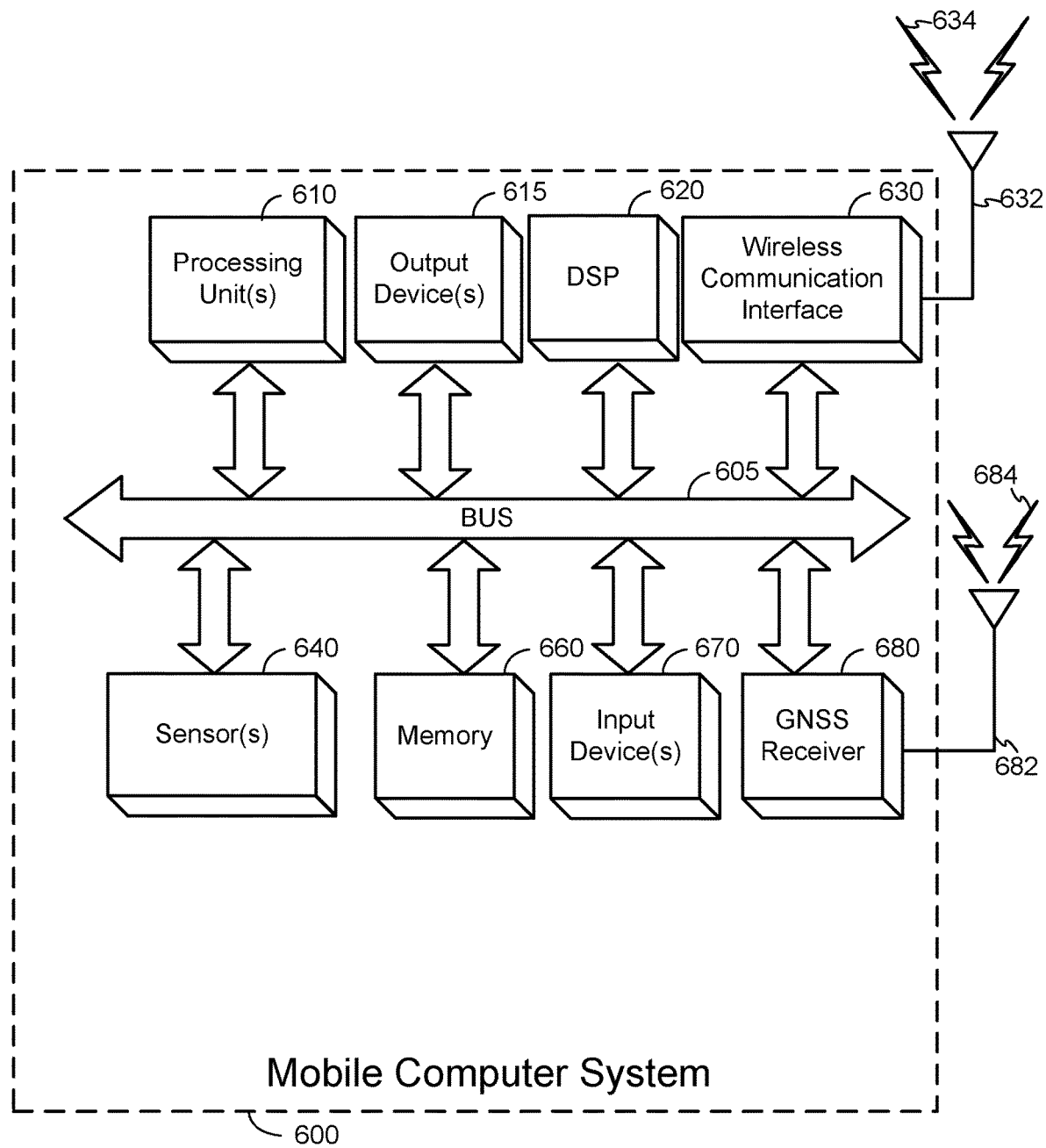
FIG. 6 is a block diagram of an embodiment of a mobile computer system.

FIG. 6 illustrates an embodiment of a mobile computer system 600, which may be utilized as described herein above. For example, the mobile computer system 800 may comprise a vehicle computer system used to manage one or more systems related to the vehicle's navigation and/or automated driving, as well as communicate with other on-board systems and/or other traffic entities. The mobile computer system 600 may be used to perform one or more of the functions of method 400 of FIG. 4 and can implement the functions of, for example, synchronization module 316. It should be noted that FIG. 8 is meant only to provide a generalized illustration of various components, any or all of which may be utilized as appropriate. It can be noted that, in some instances, components illustrated by FIG. 6 can be localized to a single physical device and/or distributed among various networked devices, which may be disposed at different physical locations on a vehicle.

The mobile computer system 600 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 6, some embodiments may have a separate Digital Signal Processor (DSP) 620, depending on desired functionality. Location determination and/or other determinations based on wireless communication may be provided in the processing unit(s) 610 and/or wireless communication interface 830 (discussed below). The mobile computer system 600 also can include one or more input devices 670, which can include devices related to user interface (e.g., a touch screen, touch pad, microphone, button(s), dial(s), switch(es), and/or the like) and/or devices related to navigation, automated driving, and the like. Similarly, the one or more output devices 615 may be related to interacting with a user (e.g., via a display, light emitting diode(s) (LED(s)), speaker(s), etc.), and/or devices related to navigation, automated driving, and the like.

The mobile computer system 600 may also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a WiFi device, a WiMax device, a WAN device and/or various cellular devices, etc.), and/or the like, which may enable the mobile computer system 800 to communicate to other traffic entities (e.g., RSUs, other vehicles, etc.). The communication can be carried out via one or more wireless communication antenna(s) 832 that send and/or receive wireless signals 834. Wireless communication interface 830 can be part of wireless interface 206 of FIG. 2A and FIG. 3A-FIG. 3F.

The mobile computer system 600 can further include sensor(s) 640. Sensors 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensors 840 may be used, for example, to determine certain real-time characteristics of the vehicle, such as location, velocity, acceleration, and the like.

Embodiments of the mobile computer system 600 may also include a GNSS receiver 680 capable of receiving signals 684 from one or more GNSS satellites using an antenna 682 (which could be the same as antenna 632). Positioning based on GNSS signal measurement can be utilized to determine a current location of the vehicle, which, as discussed above, may be used as a trigger for determining and/or sending an ITM as described herein. The GNSS receiver 680 can extract a position of the mobile computer system 600, using conventional techniques, from GNSS satellites of a GNSS system, such as Global Positioning System (GPS) and/or similar systems. GNSS receiver 680 can correspond to, for example, GNSS receiver 212 of FIG. 2A and FIG. 3A-FIG. 3F.

The mobile computer system 600 may further include and/or be in communication with a memory 660. The memory 660 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 660 of the mobile computer system 600 also can comprise software elements (not shown in FIG. 6), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 660 that are executable by the mobile computer system 600 (and/or processing unit(s) 610 or DSP 620 within mobile computer system 600). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also are expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of performing time synchronization for a Cellular Vehicle-to-Everything (C-V2X) wireless interface of a vehicle, the method comprising:
   determining, by a vehicle user equipment (UE) of the vehicle, whether a Global Navigation Satellite System (GNSS) receiver of the vehicle receives a GNSS signal including time information for a time synchronization operation for the vehicle's local clock source;
   based on determining the GNSS receiver does not receive a GNSS signal including the time information, adjusting a local clock time of the vehicle's local clock source based on a system frame number (SFN) of a Master Information Block (MIB) message included in one or more wireless signals broadcasted from a base station and received by the C-V2X wireless interface of the vehicle UE, wherein:
      the one or more wireless signals comprise a System Information Block (SIB) Type 21 message; and
      adjusting the local clock time based on the SFN of the MIB message comprises:
         determining a time difference between the SFN in the SIB Type 21 message and a local clock time,
         determining a clock offset based on the time difference, and
         adjusting the local clock time based on adding the clock offset to the local clock time; and
   adjusting, by a clocking system, at least one of: a phase or a frequency of a clock signal supplied to the C-V2X wireless interface by the clocking system, wherein the adjusting is based on the adjusted local clock time obtained from the vehicle's local clock source by the clocking system.

2. The method of claim 1, further comprising: based on receiving the SIB 21 message and determining that the GNSS receiver does not receive the GNSS signal including the time information, adjusting the local clock time based on the SFN of the MIB message.

3. The method of claim 2, wherein the local clock time is based on a local SFN; and
   wherein determining the time difference between the SFN in the SIB Type 21 message and a local clock time comprises:
      determining a SFN difference between the SFN in the SIB Type 21 message and the local SFN; and
      determining the time difference based on the SFN difference.

4. The method of claim 1, wherein the determination of whether the GNSS receiver receives the GNSS signal including time information for the time synchronization operation is based on whether the GNSS signal has a sufficient signal strength or a sufficiently low level of noise to allow extraction of the time information from the GNSS signal.

5. An apparatus comprising:
a Cellular Vehicle-to-Everything (C-V2X) wireless interface;
a Global Navigation Satellite System (GNSS) receiver;
a local clock source configured to maintain a local clock time;
a clocking system configured to generate a clock signal based on the local clock time and to supply the clock signal to the C-V2X wireless interface;
a memory that stores a set of instructions; and
one or more processing units communicatively coupled to the memory, the local clock source, and the C-V2X wireless interface, wherein the one or more processing units are configured to execute the set of instructions to:
  determine whether the GNSS receiver receives a GNSS signal including time information for a time synchronization operation for the local clock source;
  based on determining the GNSS receiver does not receive a GNSS signal including the time information, adjust the local clock time maintained by the local clock source based on a system frame number (SFN) of a Master Information Block (MIB) message included in one or more wireless signals broadcasted from a base station and received by the C-V2X wireless interface, wherein;
    the one or more wireless signals comprise a System Information Block (SIB) Type 21 message; and
    adjusting the local clock time based on the SFN of the MIB message comprises:
      determining a time difference between the SFN in the SIB Type 21 message and a local clock time,
      determining a clock offset based on the time difference, and
      adjusting the local clock time based on adding the clock offset to the local clock time; and
  wherein the clocking system is configured to adjust, based on the adjusted local clock time obtained from the local clock source by the clocking system, at least one of: a phase or a frequency of the clock signal supplied by the clocking system to the C-V2X wireless interface.

6. The apparatus of claim 5, further comprising: based on receiving the SIB 21 message and determining that the GNSS receiver does not receive the GNSS signal including the time information, adjusting the local clock time based on the SFN of the MIB message.

7. The apparatus of claim 6, wherein the local clock time is based on a local SFN; and
wherein the one or more processing units are configured to execute the set of instructions to determine the time difference between the SFN in the SIB Type 21 message and a local clock time based on:
  determining a SFN difference between the SFN in the SIB Type 21 message and the local SFN; and
  determining the time difference based on the SFN difference.

8. The apparatus of claim 5, wherein the one or more processing units are configured to execute the set of instructions to determine whether the GNSS receiver of the vehicle receives the GNSS signal including the time information for the time synchronization operation based on at least one of: whether the GNSS receiver receives the GNSS signal, whether the GNSS signal has a sufficient signal strength or a sufficiently low level of noise to allow extraction of the time information from the GNSS signal, or whether the GNSS signal includes the time information.

9. A device comprising:
means for determining whether a Global Navigation Satellite System (GNSS) receiver of a vehicle receives a GNSS signal including time information for a time synchronization operation for the vehicle's local clock source;
means for, based on determining the GNSS receiver does not receive a GNSS signal including the time information, adjusting a local clock time of the vehicle's local clock source based on a system frame number (SFN) of a Master Information Block (MIB) message included in one or more wireless signals broadcasted from a base station and received by a Cellular Vehicle-to-Everything (C-V2X) wireless interface of a vehicle UE, wherein:
  the one or more wireless signals comprise a System Information Block (SIB) Type 21 message; and
  the means for adjusting the local clock time based on the SFN of the MIB message comprises means for:
    determining a time difference between the SFN in the SIB Type 21 message and a local clock time,
    determining a clock offset based on the time difference, and
    adjusting the local clock time based on adding the clock offset to the local clock time; and
means for adjusting, by a clocking system, at least one of: a phase or a frequency of a clock signal supplied to a C-V2X wireless interface by the clocking system, wherein the adjusting is based on the adjusted local clock time obtained from the vehicle's local clock source by the clocking system.

10. The device of claim 9, further comprising means for:
based on receiving the SIB 21 message and determining that the GNSS receiver does not receive the GNSS signal including the time information, adjusting the local clock time based on the SFN of the MIB message.

11. The device of claim 10, further comprising:
means for maintaining a local SFN; and
wherein the means for determining the time difference between the SFN in the SIB Type 21 message and a local clock time comprise:
  means for determining a SFN difference between the SFN in the SIB Type 21 message and the local SFN; and
  means for determining the time difference based on the SFN difference.

12. The device of claim 9, further comprising means for determining whether the GNSS receiver receives the GNSS signal including time information for the time synchronization operation based on at least one of: whether the GNSS receiver receives the GNSS signal, whether the GNSS signal has a sufficient signal strength or a sufficiently low level of noise to allow extraction of the time information from the GNSS signal, or whether the GNSS signal includes the time information.

13. The method of claim 1, wherein adjusting a local clock time is responsive to a determination by the vehicle UE, based on the SIB, that the base station supports C-V2X communications.

14. The apparatus of claim 5, wherein the one or more processing units are configured to execute the set of instructions to adjust the local clock time responsive to a determination by the one or more processing units, based on the SIB, that the base station supports C-V2X communications.

15. The device of claim 9, wherein the means for adjusting the local clock time is configured to adjust the local clock time responsive to a determination by the vehicle UE, based on the SIB, that the base station supports C-V2X communications.

* * * * *